(12) United States Patent
Tidwell

(10) Patent No.: US 7,597,202 B1
(45) Date of Patent: Oct. 6, 2009

(54) REMOTE FILTER

(75) Inventor: Kelly Tidwell, Huntington Beach, CA (US)

(73) Assignee: Pure Power! Incorporated, Huntington Beach, CA (US)

( * ) Notice: Subject to any disclaimer, the term of this patent is extended or adjusted under 35 U.S.C. 154(b) by 301 days.

(21) Appl. No.: 11/005,123

(22) Filed: Dec. 6, 2004

Related U.S. Application Data

(60) Provisional application No. 60/527,064, filed on Dec. 4, 2003.

(51) Int. Cl.
| | |
|---|---|
| *B01D 35/147* | (2006.01) |
| *B01D 27/06* | (2006.01) |
| *B01D 27/10* | (2006.01) |
| B01D 35/00 | (2006.01) |
| B01D 35/02 | (2006.01) |
| B01D 27/00 | (2006.01) |

(52) U.S. Cl. .................. 210/435; 210/440; 210/442; 210/443; 210/130; 210/429

(58) Field of Classification Search ............ 210/447, 210/444, 440, 435, 423, 416.5, 316, 313, 210/132, 342, 307, 304, 249, 248, 232, 198.1, 210/90

See application file for complete search history.

(56) References Cited

U.S. PATENT DOCUMENTS

| | | | |
|---|---|---|---|
| 2,966,990 A | | 1/1961 | Sicard |
| 3,232,437 A | * | 2/1966 | Hultgren .................... 210/440 |
| 3,262,570 A | * | 7/1966 | Gailitis et al. .............. 210/266 |
| 3,283,902 A | * | 11/1966 | Silverwater et al. .......... 210/90 |
| 3,315,809 A | | 4/1967 | Hultgren |
| 3,334,754 A | * | 8/1967 | Kudlaty .................... 210/444 |
| 3,526,590 A | | 9/1970 | Russo |
| 3,684,100 A | * | 8/1972 | Close ...................... 210/444 |
| 4,529,515 A | * | 7/1985 | Selz ........................ 210/234 |
| 4,622,136 A | | 11/1986 | Karcey |
| 4,872,976 A | | 10/1989 | Cudaback |
| 5,066,391 A | | 11/1991 | Faria |
| 5,548,893 A | | 8/1996 | Koelfgen |
| 5,569,373 A | | 10/1996 | Smith et al. |
| 5,679,244 A | | 10/1997 | Tettman et al. |

(Continued)

OTHER PUBLICATIONS

OILTECH, The Spinner II Cleanable Screen Product Information and Application Chart, 2 pgs, Apr. 11, 2005.

(Continued)

*Primary Examiner*—Krishnan S Menon
*Assistant Examiner*—Madeline Gonzalez
(74) *Attorney, Agent, or Firm*—Blakely, Sokoloff, Taylor & Zafman LLP

(57) ABSTRACT

A reusable remote filter having a can-like body, a tubular woven metal mesh filter element fitting concentrically within the can-like body, and a cap having the first and second threaded openings therein, the cap being threadedly assembleable to the can-like body, the first threaded opening being in fluid communication with a first port at a right angle thereto, the first port flaring outwardly to be substantially of the same diameter as the inner diameter of the tubular woven metal mesh filter element when the reusable remote filter is assembled, the second threaded opening being in fluid communication with the periphery of the tubular woven metal mesh filter element around substantially the entire periphery of the tubular woven metal mesh filter element.

12 Claims, 4 Drawing Sheets

U.S. PATENT DOCUMENTS

| | | |
|---|---|---|
| 5,711,872 A | 1/1998 | Jones et al. |
| 5,888,383 A | 3/1999 | Cox |
| 6,024,229 A | 2/2000 | Ayers |
| 6,086,763 A | 7/2000 | Baumann |
| 6,221,242 B1 | 4/2001 | Deibel et al. |
| 6,228,274 B1 | 5/2001 | Deibel et al. |
| 6,381,983 B1 * | 5/2002 | Angelo et al. .................. 62/474 |
| 6,554,139 B1 | 4/2003 | Maxwell et al. |
| 6,568,539 B1 | 5/2003 | Deibel et al. |
| 6,595,372 B1 * | 7/2003 | Minowa et al. ............. 210/440 |
| 6,716,361 B2 | 4/2004 | Deibel et al. |
| 7,413,089 B1 * | 8/2008 | Tidwell ...................... 210/443 |

OTHER PUBLICATIONS

OILTECH, "Why must the Spinner II's Cleanable screen be used with a Spinner II centrifuge?", 2 pgs, Apr. 11, 2005.

System 1 Filter Products, "The Leader in High Technology Engine Filtration", pp. 1-4, 6-7, Apr. 11, 2005.

* cited by examiner

REMOTE FILTER

CROSS-REFERENCE TO RELATED APPLICATION

This application claims the benefit of U.S. Provisional Patent Application No. 60/527,064 filed Dec. 4, 2003.

BACKGROUND OF THE INVENTION

1. Field of the Invention

The present invention relates to the field of oil filters, and more particularly to oil filters as are frequently used on internal combustion engines.

2. Prior Art

Internal combustion engines, including gasoline and diesel engines as are commonly used in cars, trucks, boats and stationary power plants, frequently use a canister type oil filter for filtering the crankcase oil as it circulates through the pressure lubrication system. These filters normally screw onto a fitting on the engine, though in some instances are mounted adjacent the engine (referred to herein as a remote filter) and connected to the engine through supply and return hoses. Normally the filters are disposable, being replaced as needed with a new filter. Filters are known however that have reusable cartridges. However these filters are of different designs, and do not have the generous porting and oil distribution within the filter that the present invention has.

DETAILED DESCRIPTION OF THE PREFERRED EMBODIMENTS

The present invention comprises a remote filter usable in such applications, by way of example, as a remote oil filter or a remote fuel filter for internal combustion engines, or for hydraulic systems. As may be seen from the following description, the filter includes a reusable filter element and a bypass valve to allow flow, particularly oil flow, to be maintained in the event the filter unexpectedly becomes substantially plugged.

Figure 1:
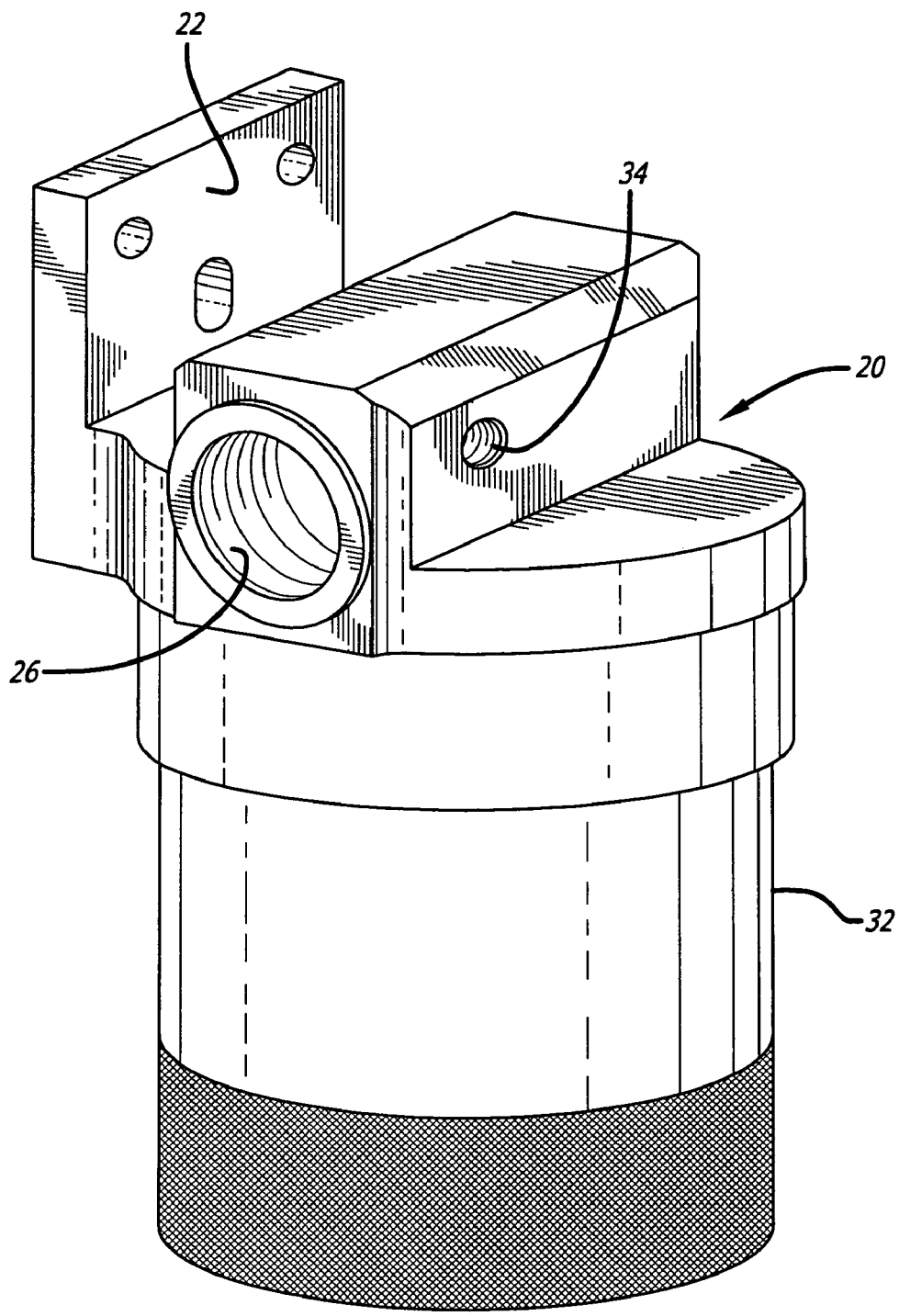
FIG. 1 is a perspective view of a preferred embodiment of the present invention.
Figures 2, 6:
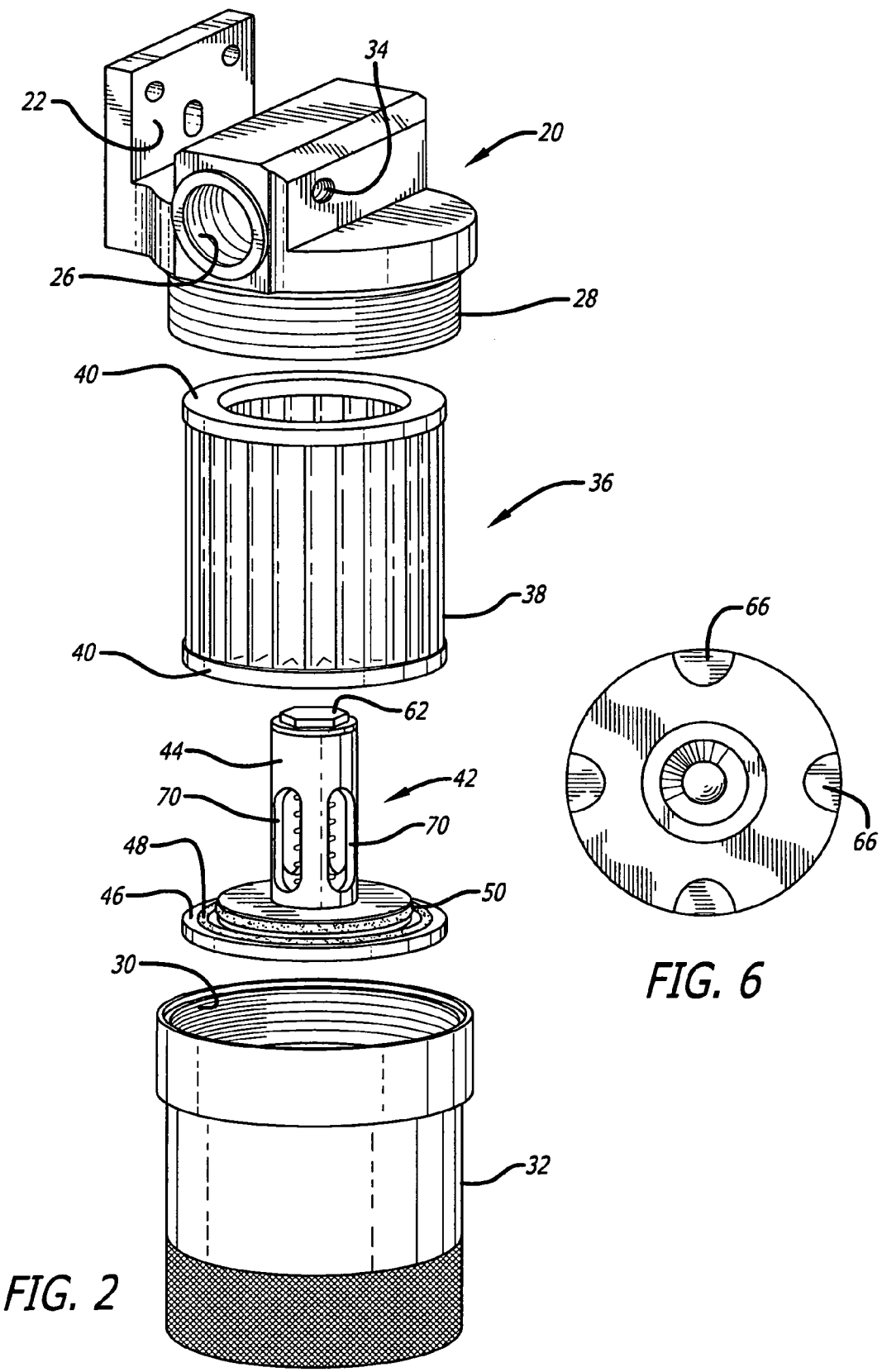
FIG. 2 is an exploded perspective view of the preferred embodiment of the present invention.
FIG. 6 is a bottom view of the bypass valve assembly 42 of FIG. 2.
Figure 3:
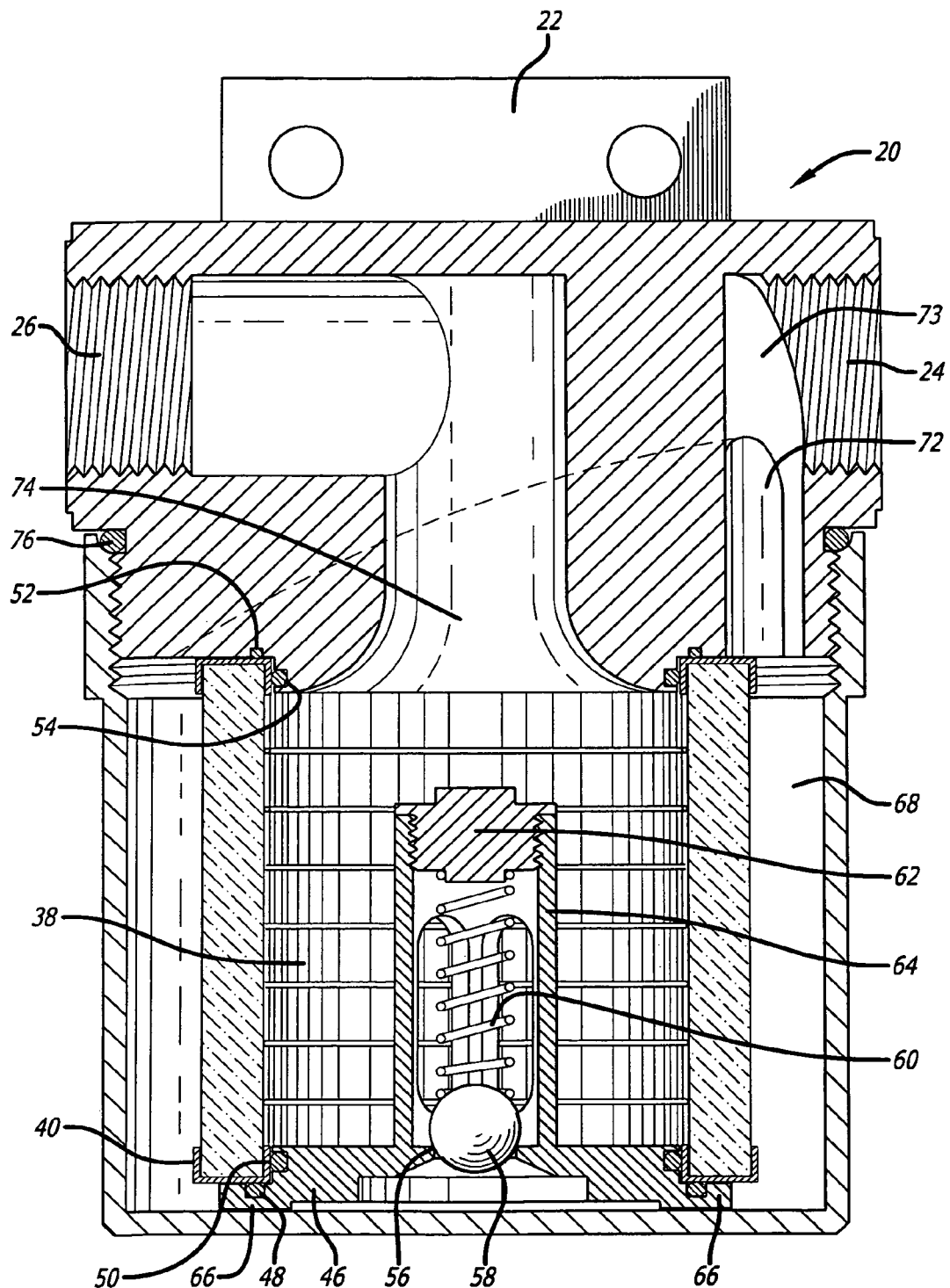
FIG. 3 is a side cross section of the preferred embodiment of the present invention.

A perspective view, an exploded view and a cross-section of one embodiment of the filter in accordance with the present invention may be seen in FIGS. 1, 2 and 3, respectively. The filter is comprised of a top member 20 having a mounting flange 22 thereon with bolt holes therein for mounting, a threaded inlet port 24 and a threaded outlet port 26. The top member 20 further has a downward projecting threaded region 28 over which the threaded region 30 of the filter body 32 may be screwed for assembly of the filter. The top member 20 also includes a threaded port 34 communicating with the outlet port 26 for attaching a pressure gauge or a temperature gauge. This port, of course, may be plugged with a threaded plug if not used.

Fitting within the filter body 32 is a reusable filter cartridge 36. The filter cartridge is a stainless steel woven mesh which is pleated, formed into a cylindrical shape, the mating edges welded, and then cemented in upper and lower stainless steel cup-like members 54 with epoxy to form an integral and durable filter assembly. In that regard, woven steel meshes are commercially available in the desired porosity ranges that capture a larger percentage of particles larger than their rated porosity and do not clog as readily as paper filter materials do.

Also fitting within the filter body 32 is a bypass valve assembly generally indicated by the numeral 42. The bypass assembly has a tubular member 44 integral with a flange-like member 46 at the lower end thereof. The flange-like member 46, in turn, has O-ring seals 48 and 50 which seal against the bottom cup-like member 40 on the filter member 36, the top cup-like member 40 and the filter member 36 being sealed with respect to the top member 20 by O-rings 52 and 54. The flange-like member 46 includes a valve seat 56 with ball 58 being spring loaded downward against the valve seat by spring 60, the spring being retained at the upper end by spring retainer 62 threaded into the end of the tubular member 64. The flange-like member 46 stands on feet-like projections 66 (see particularly FIG. 6) so as to provide a substantial flow area under the feet-like projections. Thus, if pressure begins to build excessively in region 68 in the filter assembly, ball 58 will move upward to allow flow under the flange-like member 46 and through the ball valve, out through openings 70 and tube-like member 64 to the outlet port 26. The pressure required to open the bypass valve, of course, may be set by changing the spring or its preload as desired.

One of the features of the present invention is the generous porting, including the broad porting to allow substantially unobstructed flow of the fluid to be filtered from the inlet and smooth, gentle porting in the outlet of the filter, particularly in region 74, to also avoid any substantial restriction in flow in the outlet of the filter. In that regard, the inlet porting is double cut, not including the cutting and threading of port 24, to minimize any flow restriction, namely by the cutting of local region 73 to provide a large flow passage in communication with the inlet port 24, and the cutting of region 72 extending around most of the periphery of the filter element 36 (see the dashed line in FIG. 3 representing the top of the region 72) for good distribution of the fluid around the periphery of the filter element.

In use, the filter may be readily disassembled by unscrewing the filter body from the top member, pouring out the used oil (or other fluid) therein and removing and cleaning the filter element. The filter element, being metal, may readily be cleaned with an appropriate solvent or even cleaned with soap and water, and reused indefinitely. This, of course, eliminates the new filter stocking requirements, the old filter disposable problems, and the costs associated with both, providing highly reliable, high quality oil filtration, or alternatively, fuel or hydraulic fluid or other fluid filtration. In that regard, while sintered metal filter elements could be used, the woven wire mesh is preferred as not being so easily clogged, as being more easily cleaned, and in general presenting a substantially larger filter area for a given size filter cartridge by the pleats therein. Assembly, of course, is also simply a matter of reassembling the parts and screwing the filter body 32 back onto the top member 20, with O-ring 76 providing a seal between the filter body and the top member. Preferably the cleaned filter body is filled or nearly filled with oil (or other fluid) before assembly to obtain more immediate circulation on system startup.

Figure 4:
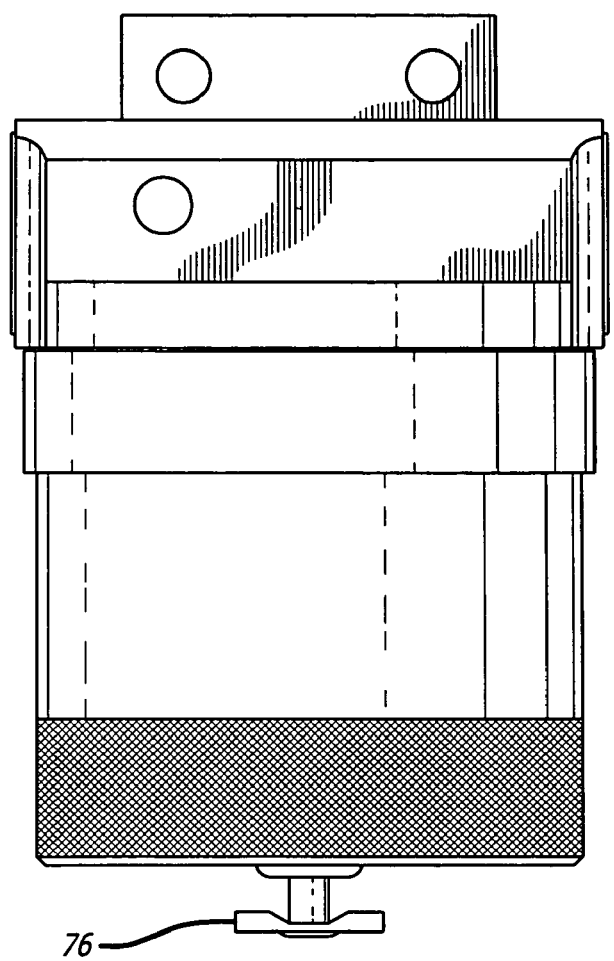
FIG. 4 is front view of the preferred embodiment of the present invention.
Figure 5:
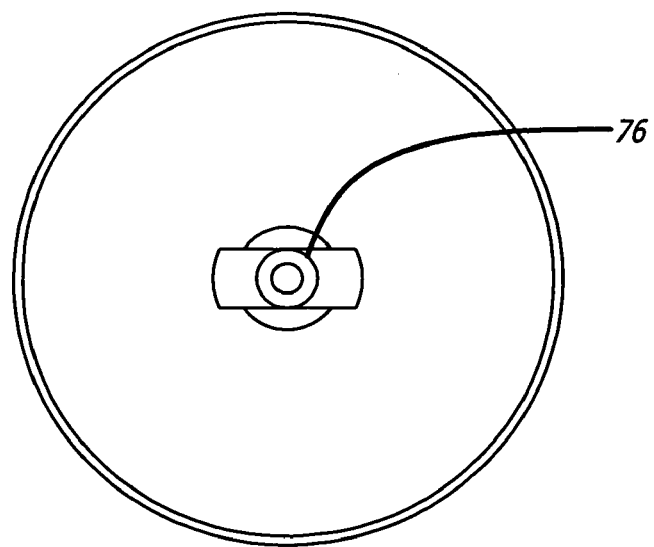
FIG. 5 is a bottom view of the preferred embodiment of the present invention.

Now referring to FIGS. 4 and 5, an alternate embodiment of the present invention may be seen. In this embodiment, petcock 70 provides controllable communication with the interior of the filter assembly. When used as a fuel filter, this allows the draining of controlled amounts of fluid from the filter, typically used to detect and eliminate any accumulation of water in the fuel filter before the water may accumulate to an extent causing an engine to stop. Also, even when used for other purposes, the petcock may be useful to drain the filter body 32 before it is unscrewed for cleaning, though a temporary screw-in plug may be also used for this purpose, or the port permanently blocked by a screw-in plug if this feature is not used.

The top member 20, the filter body 32, tubular member 44 integral with a flange-like member 46 and the spring retainer 62 in the preferred embodiment are all machined from solid stock, preferably 6061-T6 aluminum. This provides a very strong filter for the most demanding use, such as in hydraulic systems. The threaded inlet and outlet ports preferably have AN12 threads for aircraft use, though other threads may be provided, such as AN10 or other sizes or in accordance with other standards, or adapters used if connections to lines having different threads are to be made.

The filters of the present invention may be fabricated in different sizes as desired to accommodate uses in such diverse applications as aircraft, race cars, larger boats, hydraulic systems of various sizes, etc. Also while certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A reusable remote filter comprising:
   a cylindrical-shaped filter housing having an open end and a closed end;
   a tubular woven metal mesh filter element fitting concentrically within the filter housing; and
   a cap, the cap having an inlet opening and an outlet opening therein, the inlet opening and the outlet opening being substantially coaxial and perpendicular to an axis of the tubular pleated woven stainless steel filter element, the cap being threadedly assembleable to the filter housing, the outlet opening being in fluid communication with a first port at a right angle thereto, the first port smoothly increasing in diameter as it extends from the outlet opening to be substantially of the same diameter as the inner diameter of the tubular woven metal mesh filter element when the reusable remote filter is assembled, the inlet opening being in fluid communication with an immediately adjacent enlarged local region that provides a flow passage, the local region being in fluid communication with a distribution region extending from the local region around both sides of the first port to encircle substantially the entire periphery of the tubular woven metal mesh filter element and tapering from a maximum distribution region adjacent the enlarged local region to a minimum distribution region at a position substantially diametrically opposed to the enlarged local region;
   the cap having a mounting flange for mounting the reusable remote filter on a flat surface with the axis of the tubular woven metal filter element parallel to the flat surface;
   whereby fluid entering the inlet opening of the reusable remote filter is distributed above and around a diameter exceeding the diameter of the tubular woven metal mesh filter element while being gradually deflected toward the tubular woven metal mesh filter element without passing through a flow restriction between the inlet opening and the periphery of the tubular woven metal mesh filter element.

2. The reusable filter of claim 1 wherein the woven metal mesh filter element is a stainless steel tubular woven metal filter element.

3. The reusable filter of claim 2 wherein the woven metal mesh filter element is pleated.

4. The reusable filter of claim 1 wherein the tubular woven metal mesh filter element includes an annular U shaped plate at each end thereof.

5. The reusable filter of claim 4 further comprised of O-rings sealing against ends and inner diameters of both U shaped plates of the tubular woven metal mesh filter element.

6. The reusable filter of claim 5 wherein at least one O-ring seals against an inner surface of the cap at a first end of the tubular woven metal mesh filter element.

7. The reusable filter of claim 6 wherein the tubular woven metal mesh filter element includes first and second open ends, the first open end being sealed against the first port, the second open end being sealed against a plate, the plate being locally spaced away from a bottom inside surface at the closed end of the filter housing to provide a fluid flow path thereunder, the plate having a spring loaded by-pass valve thereon to bypass flow from the inlet opening to the first port.

8. The reusable filter of 7 further comprising an O-ring seal between the cap and the filter housing.

9. The reusable filter of claim 1 wherein the tubular woven metal mesh filter element includes first and second open ends, the first open end being sealed against the first port, the second open end being sealed against a plate, the plate being locally spaced away from a bottom inside surface at the closed end of the filter housing to provide a fluid flow path thereunder, the plate having a spring loaded by-pass valve thereon to bypass flow from the inlet opening to the first port.

10. A reusable remote filter comprising:
    a cylindrical-shaped filter housing having an open end and a closed end;
    a tubular pleated woven stainless steel filter element having an annular U shaped plate at each end thereof fitting concentrically within the filter housing;
    a cap, the cap having an inlet opening and an outlet opening therein, the inlet opening and the outlet opening being substantially coaxial and perpendicular to an axis of the tubular pleated woven stainless steel filter element, the cap screwing onto the filter housing and sealing with respect thereto by an O-ring, the outlet opening being in fluid communication with a first port at a right angle thereto, the first port smoothly increasing in diameter as it extends from the outlet opening to be substantially of the same diameter as an inner diameter of the tubular pleated woven stainless steel filter element, the inlet opening being in fluid communication with an immediately adjacent enlarged local region that provides a flow passage, the local region being in fluid communication with a distribution region extending from the local region round both sides of the first port to encircle substantially the entire periphery of the tubular pleated woven stainless steel filter element and tapering from a maximum distribution region adjacent the enlarged local region to a minimum distribution region at a position substantially diametrically opposed to the enlarged local region, a first end of the tubular pleated woven stainless steel filter element sealing against the cap with at least one O-ring;

whereby fluid entering the inlet opening of the reusable remote filter is distributed above and around a diameter exceeding the diameter of the tubular woven metal mesh filter element while being gradually deflected toward the tubular woven metal mesh filter element without passing through a flow restriction between the inlet opening and the periphery of the tubular woven metal mesh filter element;

a plate interposed between the closed end of the filter housing and one end of the tubular pleated woven stainless steel filter element, the plate being sealed with respect to the one end of the tubular pleated woven stainless steel filter element by at least one O-ring and being locally spaced away from the closed end of the filter housing to provide a fluid flow path thereunder, the plate having a spring loaded by-pass valve thereon to bypass flow from the inlet opening to the first port; and the cap having a mounting flange for mounting the reusable remote filter on a flat surface with the axis of the tubular woven metal filter element parallel to the flat surface.

11. The reusable remote filter of claim 1 wherein the cap has a port perpendicular to the outlet opening for receiving a pressure sensor to sense fluid pressure in the outlet opening.

12. The reusable remote filter of claim 10 wherein the cap has a port perpendicular to the outlet opening for receiving a pressure sensor to sense fluid pressure in the outlet opening.

* * * * *

UNITED STATES PATENT AND TRADEMARK OFFICE
CERTIFICATE OF CORRECTION

PATENT NO. : 7,597,202 B1             Page 1 of 1
APPLICATION NO. : 11/005123
DATED : October 6, 2009
INVENTOR(S) : Kelly Tidwell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this

Twenty-eighth Day of September, 2010

David J. Kappos
*Director of the United States Patent and Trademark Office*